United States Patent
Sugimoto (10) Patent No.: US 10,688,910 B2
(45) Date of Patent: Jun. 23, 2020

(54) VEHICLE LIGHTING SYSTEM AND VEHICLE

(71) Applicant: KOITO MANUFACTURING CO., LTD., Tokyo (JP)

(72) Inventor: Atsushi Sugimoto, Shizuoka (JP)

(73) Assignee: KOITO MANUFACTURING CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 16/230,463

(22) Filed: Dec. 21, 2018

(65) Prior Publication Data
US 2019/0202340 A1 Jul. 4, 2019

(30) Foreign Application Priority Data
Dec. 28, 2017 (JP) ................. 2017-254314

(51) Int. Cl.
*B60Q 1/08* (2006.01)
*G05D 1/02* (2020.01)
*B60Q 1/14* (2006.01)

(52) U.S. Cl.
CPC ........... *B60Q 1/085* (2013.01); *B60Q 1/1423* (2013.01); *G05D 1/021* (2013.01); *B60Q 2300/45* (2013.01)

(58) Field of Classification Search
CPC ........... B60Q 1/08; B60Q 1/085; G05D 1/021
USPC ........................................... 362/464
See application file for complete search history.

(56) References Cited

U.S. PATENT DOCUMENTS

| | | | | |
|---|---|---|---|---|
| 6,072,391 A * | 6/2000 | Suzuki | ................... | B60K 35/00 340/468 |
| 6,487,303 B1 * | 11/2002 | Yamaguchi | ............... | G06T 7/74 382/103 |
| 2009/0174540 A1 * | 7/2009 | Smith | ...................... | B60Q 1/34 340/465 |
| 2017/0213094 A1 * | 7/2017 | Kamiya | ................... | G06T 7/73 |
| 2018/0218713 A1 * | 8/2018 | Kusanagi | ............... | G02B 27/01 |
| 2019/0011914 A1 * | 1/2019 | Park | ....................... | B60W 40/08 |
| 2019/0180485 A1 * | 6/2019 | Kim | ....................... | B60K 35/00 |

FOREIGN PATENT DOCUMENTS

JP 9-277887 A 10/1997

* cited by examiner

*Primary Examiner* — Christopher M Raabe
(74) *Attorney, Agent, or Firm* — Sughrue Mion, PLLC (57) ABSTRACT

A vehicle lighting system is provided in a vehicle capable of traveling in an automated driving mode. The vehicle lighting system includes an automated driving system (ADS) lamp configured to emit light toward an outside of the vehicle to visually present information relating to automated driving of the vehicle, and a lighting control unit configured to determine brightness of the ADS lamp according to at least one of a distance between an object outside the vehicle and the vehicle, an attribute of the object, and a road surface condition around the vehicle.

9 Claims, 5 Drawing Sheets

VEHICLE LIGHTING SYSTEM AND VEHICLE

CROSS-REFERENCE TO RELATED APPLICATIONS

The present application claims the benefit of priority of Japanese Patent Application No. 2017-254314, filed on Dec. 28, 2017, the content of which is incorporated herein by reference.

TECHNICAL FIELD

The present disclosure relates to a vehicle lighting system. Particularly, the present disclosure relates to a vehicle lighting system provided in a vehicle capable of traveling in an automated driving mode. Further, the present disclosure relates to a vehicle including the vehicle lighting system.

BACKGROUND

Recently, researches on automated driving techniques of automobiles have been actively conducted in various countries, and each country considers legislation to allow a vehicle (hereinafter the "vehicle" refers to an automobile) to travel on public roads in an automated driving mode. In the automated driving mode, a vehicle system automatically controls the traveling of the vehicle. Specifically, in the automated driving mode, the vehicle system automatically performs at least one of steering control (control of a traveling direction of the vehicle), brake control and accelerator control (control of braking and acceleration/deceleration of the vehicle) based on information (surrounding environment information) indicating a surrounding environment of the vehicle obtained from a sensor such as a camera or a radar (for example, a laser radar or a millimeter wave radar). On the other hand, in a manual driving mode described below, a driver controls the traveling of the vehicle as is the case of the conventional vehicles. Specifically, in the manual driving mode, the traveling of the vehicle is controlled according to the driver's operation (the steering operation, the brake operation, and the accelerator operation), and the vehicle system does not automatically perform the steering control, the brake control, and the accelerator control. Herein, the driving mode of the vehicle does not refer to concept which exists only in some vehicles but refers to concept which exists in all vehicles including a conventional vehicle not having an automated driving function and is classified according to, for example, a vehicle control method or the like.

Accordingly, it is expected in the future that a vehicle traveling in the automated driving mode (hereinafter referred to as an "automated driving vehicle" as appropriate) and a vehicle traveling in the manual driving mode (hereinafter referred to as a "manual driving vehicle" as appropriate) coexist on a public road.

As an example of an automated driving technique, JP-A-H9-277887 discloses an automatic following travel system where a following vehicle automatically follows a preceding vehicle. In the automatic following travel system, the preceding vehicle and the following vehicle each includes a lighting system, and character information for preventing another vehicle from interrupting between the preceding vehicle and the following vehicle is displayed on the lighting system of the preceding vehicle, and character information indicating that the following vehicle automatically follows the preceding vehicle is displayed on the lighting system of the following vehicle.

In an automated driving society where the automated driving vehicle and the manual driving vehicle coexist, it is expected that a vehicle mounted with an automated driving system lamp (hereinafter, referred to as an "ADS lamp") for visually presenting information (for example, information on the automated driving mode of the vehicle) related to automated driving to a pedestrian or the like. In this case, since the pedestrian can grasp a current situation of the automated driving vehicle by visually recognizing the ADS lamp, the pedestrian's anxiety to the automated driving vehicle can be reduced. Meanwhile, it is assumed that the visibility of the ADS lamp from an object (such as a pedestrian) decreases according to a predetermined condition. Accordingly, in the upcoming automated driving society, there is room for further consideration on the visibility of the ADS lamp.

SUMMARY

Accordingly, an aspect of the present disclosure provides a vehicle lighting system which can sufficiently ensure the visibility of an ADS lamp from an object outside a vehicle. Further, an aspect of the present disclosure provides a vehicle which can sufficiently ensure the visibility of the ADS lamp from the object outside the vehicle.

According to an embodiment of the present disclosure, there is provided a vehicle lighting system provided in a vehicle capable of traveling in an automated driving mode, the vehicle light system including:

an automated driving system (ADS, lamp configured to emit light toward an outside of the vehicle to visually present information relating to automated driving of the vehicle; and a lighting control unit configured to determine brightness of the ADS lamp according to at least one of a distance between an object outside the vehicle and the vehicle, an attribute of the object, and a road surface condition around the vehicle.

According to the above configuration, the brightness of the ADS lamp is determined according to at least one of the distance between the object and the vehicle, the attribute of the object, and the road surface condition around the vehicle. Accordingly, it is possible to provide the vehicle lighting system which can sufficiently ensure the visibility of the ADS lamp from the object (a pedestrian or the like) outside the vehicle.

In the above vehicle light system, the lighting control unit may be configured to increase the brightness of the ADS lamp according to an increase in the distance between the object and the vehicle.

According to the above configuration, since the brightness of the ADS lamp increases according to the increase in the distance between the object and the vehicle, it is possible to sufficiently ensure the visibility of the ADS lamp from the object present at a position distant from the vehicle.

In the above vehicle light system, the lighting control unit may be configured to determine the brightness of the ADS lamp to be first brightness when the object which is away from the vehicle by a predetermined distance is a pedestrian, and determine the brightness of the ADS lamp to be second brightness which is higher than the first brightness when the object which is away from the vehicle by the predetermined distance is another vehicle.

According to the above configuration, when the object is a pedestrian, the brightness of the ADS lamp is determined to be the first brightness, and when the object is another vehicle, the brightness of the ADS lamp is determined to be a second brightness which is higher than the first brightness. Accordingly, the visibility of the ADS lamp from an occupant of the other vehicle can be sufficiently ensured.

In the above vehicle light system, the lighting control unit may be configured to determine the brightness of the ADS lamp to be third brightness when the road surface is not wet, and determine the brightness of the ADS lamp to be fourth brightness which is higher than the third brightness when the road surface is wet.

According to the above configuration, when the road surface is not wet, the brightness of the ADS lamp is determined to be the third brightness, and when the road surface is wet, the brightness of the ADS lamp is determined to be the fourth brightness which is higher than the third brightness. Accordingly, even when the road surface is wet, it is possible to sufficiently ensure the visibility of the ADS lamp from the object.

Further, according to another embodiment of the present disclosure, there is provided a vehicle which is capable of traveling in an automated driving mode and includes the above vehicle lighting system.

According to the above configuration, it is possible to provide the vehicle which can sufficiently ensure the visibility of the ADS lamp from the object outside the vehicle.

According to the above configuration, a vehicle lighting system and a vehicle are provided which can sufficiently ensure the visibility of the ADS lamp from the object outside the vehicle.

DETAILED DESCRIPTION

Hereinafter, an embodiment of the present invention (hereafter, referred to as "the present embodiment") is described with reference to the drawings. In the description of the embodiment, members having the same reference numerals as those already described are not described for convenience of explanation. The dimensions of the members shown in the drawings may be different from those of actual members for convenience of explanation.

In the description of the present embodiment, a "left-right direction", an "upper-lower direction", and a "front-rear direction" are appropriately referred to for convenience of explanation. These directions are relative directions set for a vehicle 1 shown in FIG. 1. The "left-right direction" is a direction including a "left direction" and a "right direction". The "upper-lower direction" includes an "upper direction" and a "lower direction". The "front-rear direction" includes a "front direction" and a "rear direction". Although the front-rear direction is not shown in FIG. 1, it is a direction orthogonal to the left-right direction and the upper-lower direction.

Figure 1:
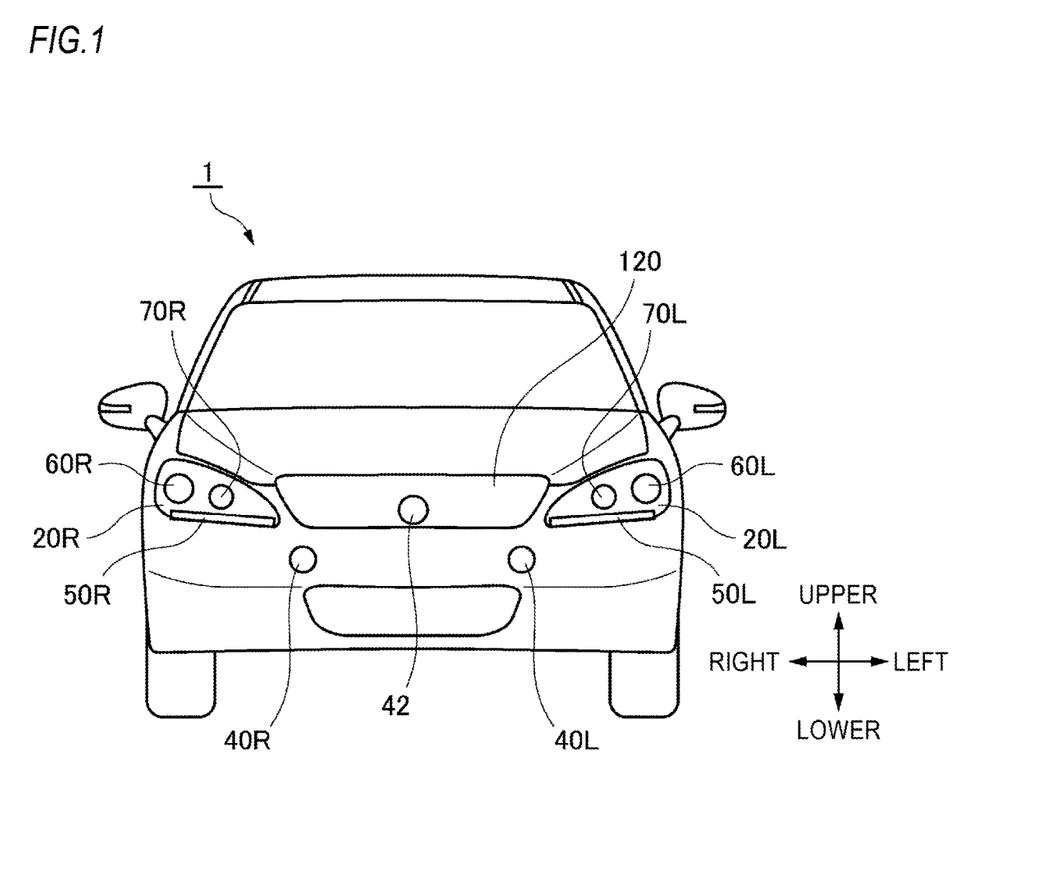
FIG. 1 is a front view of a vehicle mounted with a vehicle lighting system according to an embodiment of the present invention (hereinafter simply referred to as "the present embodiment").
Figure 2:
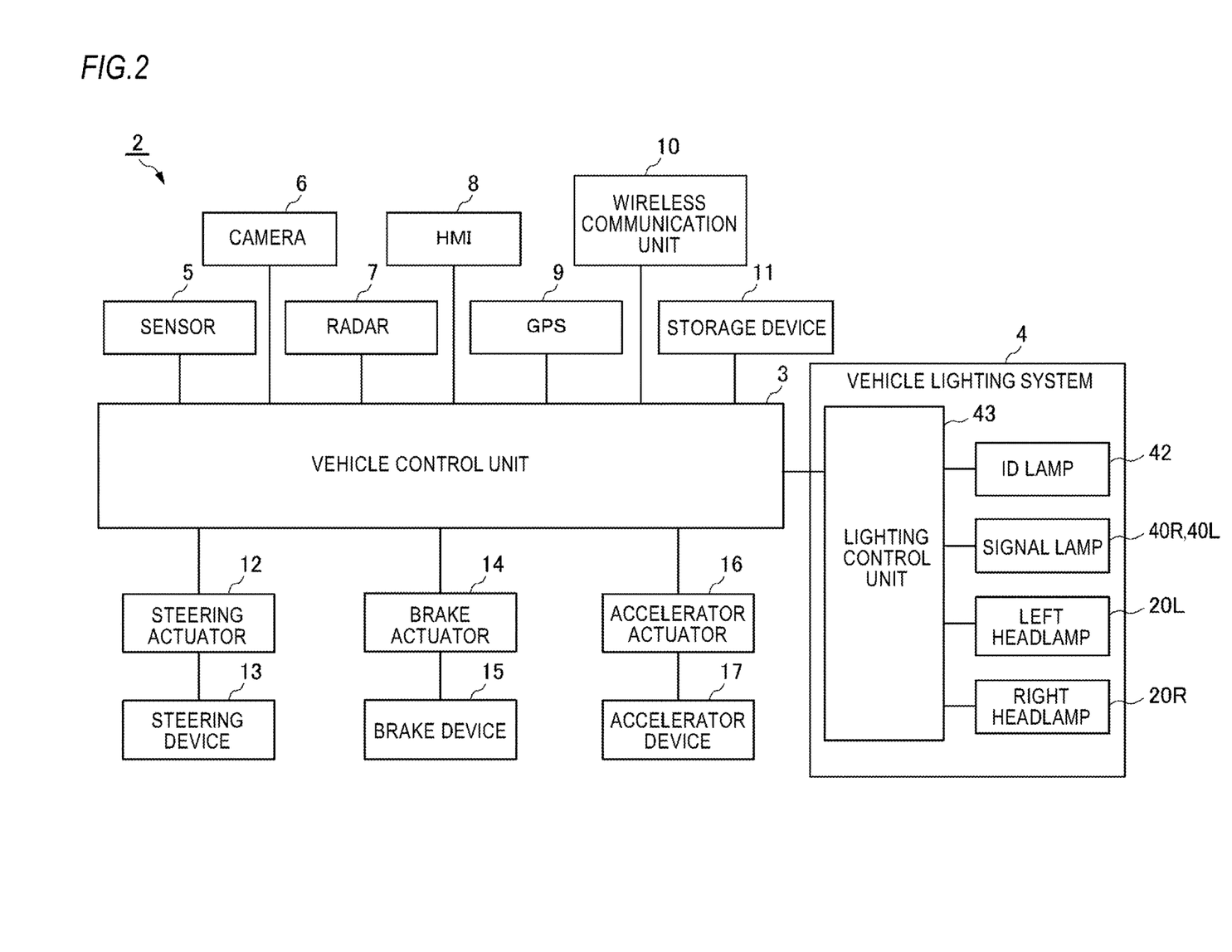
FIG. 2 is a block diagram of a vehicle system including the vehicle lighting system according to the present embodiment.

First, a vehicle lighting system 4 according to the present embodiment (hereinafter, simply referred to as a lighting system 4") will be described with reference to FIGS. 1 and 2. FIG. 1 is a plan view of the vehicle 1 mounted with the lighting system 4. FIG. 2 is a block diagram of a vehicle system 2 including the lighting system 4. The vehicle 1 (an automobile) is capable of traveling in an automated driving mode and includes the vehicle system 2. The lighting system 4 includes a left headlamp 20L, a right headlamp 20R, an ID lamp 42, signal lamps 40R, 40L, and a lighting control unit 43.

The left headlamp 20L is mounted on a front of the vehicle 1, and includes a low-beam lamp 60L configured to irradiate a low beam forward of the vehicle 1, a high-beam lamp 70L configured to irradiate a high beam toward the front of the vehicle 1, and a clearance lamp 50L. The low-beam lamp 60L, the high-beam lamp 70L, and the clearance lamp 50L include one or more light emitting elements such as Light Emitting Diodes (LEDs) and Laser Diodes (LDs), and an optical member such as a lens. The low-beam lamp 60L, the high-beam lamp 70L, and the clearance lamp 50L are mounted in a lamp chamber of the left headlamp 20L. The lamp chamber of the left headlamp 20L is formed of a housing (not shown) and a light-transmitting cover (not shown) attached to the housing.

The right headlamp 20R is mounted on the surface of the vehicle 1, and includes a low-beam lamp 60R configured to irradiate a low beam toward the front of the vehicle 1, a high-beam lamp 70R configured to irradiate a high beam toward the front of the vehicle 1, and a clearance lamp 50R. The low-beam lamp 60R, the high-beam lamp 70R, and the clearance lamp 50R include one or more light emitting elements such as LEDs or LDs, and an optical member such as a lens. The low-beam lamp 60R, the high-beam lamp 70R, and the clearance lamp 50R are mounted in a lamp chamber of the right headlamp 20R. The lamp chamber of the right headlamp 20R is formed of a housing (not shown) and a light-transmitting cover (not shown) attached to the housing. Hereinafter, for convenience of explanation, the left headlamp 20L and the right headlamp 20R may simply be referred to as headlamps.

The ID lamp 42 is an example of an automated driving system (ADS) lamp configured to emit light toward an outside of the vehicle 1 to visually present information relating to automated driving of the vehicle 1. Specifically, the ID lamp 42 is configured to emit light toward the outside of the vehicle 1 to visually present a driving mode of the vehicle 1. Particularly, the ID lamp 42 is configured to be turned on when the driving mode of the vehicle 1 is an advanced driving support mode or a fully automated driving mode, and turned off when the driving mode of the vehicle 1 is a driving support mode or a manual driving mode. The operation mode of the vehicle 1 will be described in detail below. The ID lamp 42 includes one or more light emitting elements such as LEDs or LDs, and an optical member such as a lens. The ID lamp 42 is disposed in a grille 120 of the vehicle 1. The lighting color of the ID lamp 42 is, for example, yellow (selective yellow). The lighting color, the arrangement place, or the shape of the ID lamp 42 is not particularly limited.

The signal lamps 40L, 40R are examples of the ADS lamp, and are configured to emit light toward the outside of the vehicle 1 to visually present an intention of the vehicle 1. In this regard, the signal lamps 40L, 40R can realize visual communication between the vehicle 1 and an object (for example, another vehicle, a pedestrian or the like) outside the vehicle 1 by changing a lighting mode thereof. For example, the signal lamps 40L, 40R may blink when the vehicle 1 gives way for a pedestrian. In this case, the pedestrian can recognize that the vehicle 1 gives way for the pedestrian by seeing the blinking of the signal lamps 40L, 40R. The signal lamps 40L, 40R include one or more light emitting elements such as LEDs or LDs, and an optical member such as a lens. The signal lamps 40L, 40R are arranged below the grille 120. Particularly, the signal lamps 40L, 40R may be arranged symmetrically with respect to a center line of the vehicle 1. The lighting color of the signal lamps 40L, 40R is, for example, yellow (selective yellow) or white. The lighting color, the arrangement place, or the shape of the signal lamps 40L, 40R is not particularly limited.

Next, the vehicle system 2 of the vehicle 1 will be described with reference to FIG. 2. FIG. 2 shows a block diagram of the vehicle system 2. As shown in FIG. 2, the vehicle system 2 includes a vehicle control unit 3, a lighting system 4, a sensor 5, a camera 6, a radar 7, a Human Machine Interface (HMI) 8, a Global Positioning System (GPS) 9, a wireless communication unit 10, and a storage device 11. Further, the vehicle system 2 includes a steering actuator 12, a steering device 13, a brake actuator 14, a brake device 15, an accelerator actuator 16, and an accelerator device 17.

The vehicle control unit 3 is configured to control the traveling of the vehicle 1. The vehicle control unit 3 includes, for example, at least one electronic control unit (ECU). The electronic control unit includes a computer system (for example, a System on a Chip (SoC) or the like) including one or more processors and one or more memories, and an electronic circuit including an active element such as a transistor and a passive element. The processor is, for example, a Central Processing Unit (CPU), a Micro Processing Unit (MPU), a Graphics Processing Unit (GPU), and/or a Tensor Processing Unit (TPU). The CPU may include a plurality of CPU cores. The GPU may include a plurality of GPU cores. The memory includes a Read Only Memory (ROM) and a Random Access Memory (RAM). The ROM may store a vehicle control program. For example, the vehicle control program may include an artificial intelligence (AI) program for automated driving. The AI program is constructed by supervised or unsupervised machine learning (particularly, deep learning) using a multilayer neural network. The RAM may temporarily store the vehicle control program, vehicle control data, and/or surrounding environment information indicating surrounding environment of the vehicle. The processor may be configured to develop a program selected from various vehicle control programs stored in the ROM on the RAM, and execute various kinds of processing in cooperation with the RAM. Further, the computer system may include a non-von Neumann computer such as an Application Specific Integrated Circuit (ASIC) or a Field-Programmable Gate Array (FPGA). Further, the computer system may include a combination of a von Neumann computer and a non-von Neumann computer.

As described above, the lighting system 4 includes the left headlamp 20L, the right headlamp 20R, the ID lamp 42, the signal lamps 40R, 40L, and the lighting control unit 43. The lighting control unit 43 is configured to control visual modes (lighting modes) of the left headlamp 20L, the right headlamp 20R, the ID lamp 42, and the signal lamps 40R, 40L.

For example, the lighting control unit 43 may change the lighting mode of the emitted light from the left headlamp 20L (or the right headlamp 20R) according to the surrounding environment information indicating, the surrounding environment outside the vehicle 1. Particularly, the lighting control unit 43 may switch between the high beam and the low beam according to the surrounding environment information.

The lighting control unit 43 is configured to control turning-on/off of the ID lamp 42 according to the driving mode of the vehicle 1. Further, the lighting control unit 43 is configured to control the visual mode (turning-on/off, blinking or the like) of the signal lamps 40R, 40L in order to realize visual communication between the vehicle 1 and the object (a pedestrian or the like).

The lighting control unit 43 includes an electronic control unit (ECU) and is electrically connected to a power source (not shown). The electronic control unit includes a computer system (for example, a SoC or the like) including one or more processors and one or more memories, and an analog processing circuit including an active element such as a transistor and a passive element. The processor is, for example, a CPU, an MPU, a GPU, and/or a TPU. The memory includes a ROM and a RAM. Further, the computer system may include a non-von Neumann computer such as an ASIC or an FPGA. The analog processing circuit includes a lamp driving circuit (for example, an LED driver or the like) configured to control the driving of the left headlamp 20L, the right headlamp 20R, the ID lamp 42, and the signal lamps 40R, 40L. Further, the analog processing circuit may further include an actuator driving circuit configured to control the driving of an optical axis adjustment actuator which is configured to adjust optical axes of the headlamps. Here, the optical axis adjustment actuator is configured by an electromagnetic solenoid and includes a first optical axis adjustment actuator configured to adjust an optical axis of the high-beam lamp and a second optical axis adjustment actuator configured to adjust an optical axis of the low-beam lamp. In the present embodiment, the vehicle control unit 3 and the lighting control unit 43 are provided as separate components, but the vehicle control unit 3 and the lighting control unit 43 may be integrally configured. In this regard, the lighting control unit 43 and the vehicle control unit 3 may be configured by a single electronic control unit.

The sensor 5 includes an acceleration sensor, a speed sensor, a gyro sensor or the like. The sensor 5 is configured to detect a traveling state of the vehicle 1 and output traveling state information to the vehicle control unit 3. The sensor 5 may further include a seating sensor which detects whether a driver is sitting on a driver's seat, a face direction sensor which detects a direction of the face of the driver, an external weather sensor which detects an external weather condition, a motion sensor which detects whether a person is in the vehicle, or the like.

For example, the camera 6 includes an imaging element such as a Charge-Coupled Device (CCD) or a complementary MOS (CMOS). The camera 6 is configured to acquire image data indicating the surrounding environment of the vehicle 1 and transmit the image data to the vehicle control unit 3. The vehicle control unit 3 specifies the surrounding environment information based on the transmitted image data. Here, the surrounding environment information may include information about the object (a pedestrian, another vehicle, a sign or the like) outside the vehicle 1. For example, the surrounding environment information may include information about an attribute of the object outside the vehicle 1 and information about a distance or a position of the object with respect to the vehicle 1. The camera 6 may be configured as a monocular camera or a stereo camera.

The radar 7 is a millimeter wave radar, a microwave radar, and/or a laser radar (for example, a LiDAR unit). For example, the LiDAR unit is configured to detect the surrounding environment of the vehicle 1. Particularly, the LiDAR unit is configured to acquire 3D mapping data (point group data) indicating the surrounding environment of the vehicle 1 and transmit the 3D mapping data to the vehicle control unit 3. The vehicle control unit 3 specifies the surrounding environment information based on the transmitted 3D mapping data.

The HMI 8 includes an input unit which receives an input operation from a driver and an output unit which outputs traveling information or the like to the driver. The input unit includes a steering wheel, an accelerator pedal, a brake pedal, a driving mode switch which switches the driving mode of the vehicle 1, or the like. The output unit is a display which displays various kinds of traveling information. The GPS 9 is configured to acquire current position information of the vehicle 1 and output the acquired current position information to the vehicle control unit 3.

The wireless communication unit 10 is configured to receive information about the other vehicle around the vehicle 1 (for example, traveling information or the like) from the other vehicle and transmit the information about the vehicle 1 (for example, the traveling information or the like) to the other vehicle (vehicle-to-vehicle communication). The wireless communication unit 10 is configured to receive infrastructure information from infrastructure equipment such as a traffic light and an indicator light, and transmit the traveling information of the vehicle 1 to the infrastructure equipment (road-to-vehicle communication). The wireless communication unit 10 is configured to receive information about a pedestrian from a portable electronic device (a smartphone, a tablet, a wearable device, or the like) carried by the pedestrian and transmit the own vehicle travel information of the vehicle 1 to the portable electronic device (pedestrian-to-vehicle communication). The vehicle 1 may directly communicate with the other vehicle, the infrastructure equipment, or the portable electronic device in an ad hoc mode, or may communicate via an access point. Further, the vehicle 1 may communicate with the other vehicle, the infrastructure equipment, or the portable electronic device via a communication network such as the Internet (not shown). The wireless communication standard is, for example, Wi-Fi (registered trademark), Bluetooth (registered trademark), ZigBee (registered trademark), LPWA, DSRC (registered trademark), or Li-Fi. The vehicle 1 may communicate with the other vehicle, the infrastructure equipment, or the portable electronic device by using a fifth generation mobile communication system (5G).

The storage device 11 is an external storage device such as a hard disk drive (HDD) or a Solid State Drive (SSD). The storage device 11 may store 2D or 3D map information and/or a vehicle control program. For example, the 3D map information may be configured by point group data. The storage device 11 is configured to output the map information or the vehicle control program to the vehicle control unit 3 in response to a request from the vehicle control unit 3. The map information and the vehicle control program may be updated via the wireless communication unit 10 and the communication network such as the Internet or the like.

When the vehicle 1 travels in the automated driving mode, the vehicle control unit 3 automatically generates at least one of the steering control signal, the accelerator control signal, and the brake control signal based on the traveling state information, the surrounding environment information, the current position information, the map information or the like. The steering actuator 12 is configured to receive the steering control signal from the vehicle control device 3 and control the steering device 13 based on the received steering control signal. The brake actuator 14 is configured to receive the brake control signal from the vehicle controller 3 and control the brake device 15 based on the received brake control signal. The accelerator actuator 16 is configured to receive the accelerator control signal from the vehicle control device 3 and control the accelerator device 17 based on the received accelerator control signal. Accordingly, the vehicle control unit 3 automatically controls the traveling of the vehicle 1 based on the traveling state information, the surrounding environment information, the current position information, the map information or the like. That is, in the automated driving mode, the traveling of the vehicle 1 is automatically controlled by the vehicle system 2.

On the other hand, when the vehicle 1 travels in the manual driving mode, the vehicle control unit 3 generates the steering control signal, the accelerator control signal, and the brake control signal according to a manual operation of the driver to the accelerator pedal, the brake pedal, and the steering wheel. Accordingly, in the manual driving mode, since the steering control signal, the accelerator control signal, and the brake control signal are generated by the manual operation of the driver, the traveling of the vehicle 1 is controlled by the driver.

Next, the driving mode of the vehicle 1 will be described. The driving mode includes the automated driving mode and the manual driving mode. The automated driving mode includes the fully automated driving mode, the advanced driving support mode, and the driving support mode. In the fully automated driving mode, the vehicle system 2 automatically performs all traveling controls including a steering control, a brake control, and an accelerator control, and the driver is not in a state of being capable of driving the vehicle 1. In the advanced driving support mode, the vehicle system 2 automatically performs all the traveling controls including the steering control, the brake control, and the accelerator control, and the driver does not drive the vehicle 1 while the driver is capable of driving the vehicle 1. In the driving support mode, the vehicle system 2 automatically performs some of the traveling controls including the steering control, the brake control, and the accelerator control, and the driver drives the vehicle 1 under the driving support of the vehicle system 2. Meanwhile, in the manual driving mode, the vehicle system 2 does not automatically perform the traveling control, and the driver drives the vehicle 1 without the driving support of the vehicle system 2.

The driving mode of the vehicle 1 may be switched by operating the driving mode switch. In this case, the vehicle control unit 3 switches the driving mode of the vehicle 1 among the four driving modes (the fully automated driving mode, the advanced driving support mode, the driving support mode, and the manual driving mode) according to the operation of the driver to the driving mode switch. Further, the driving mode of the vehicle 1 may be automatically switched based on information about a traveling permitted section where traveling of the automated driving vehicle is permitted and a traveling prohibited section where the traveling of the automated driving vehicle is prohibited or information about the external weather condition. In this case, the vehicle control unit 3 switches the driving mode of the vehicle 1 based on these kinds of external information. Further, the driving mode of the vehicle 1 may be automatically switched by using the seating sensor, the face direction sensor, or the like. In this case, the vehicle control unit 3 switches the driving mode of the vehicle 1 based on an output signal from the seating sensor or the face direction sensor.

Figure 3:
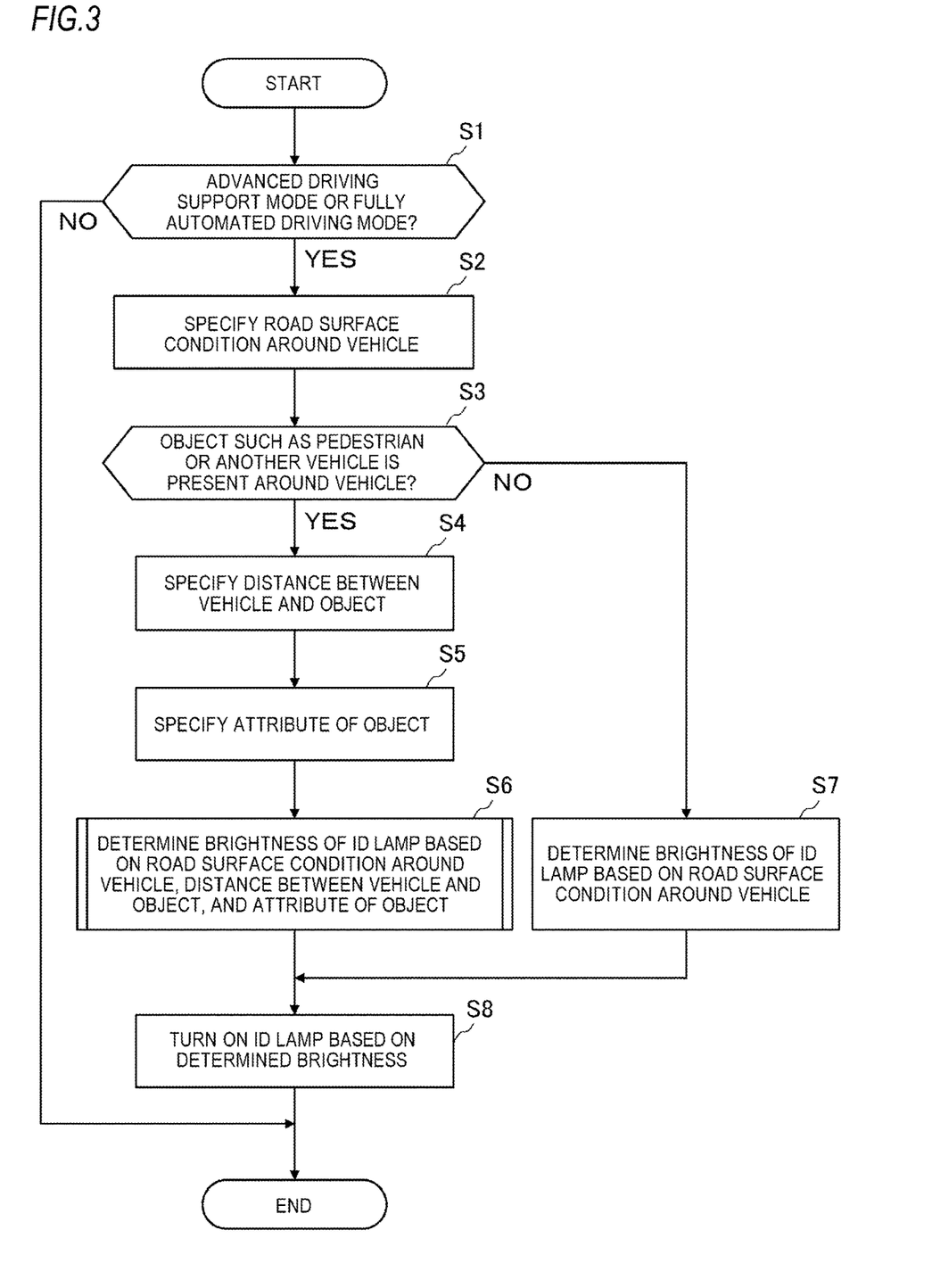
FIG. 3 is a flowchart illustrating an example of processing of determining brightness of an ID lamp in the vehicle lighting system according to the present embodiment.
Figure 4:
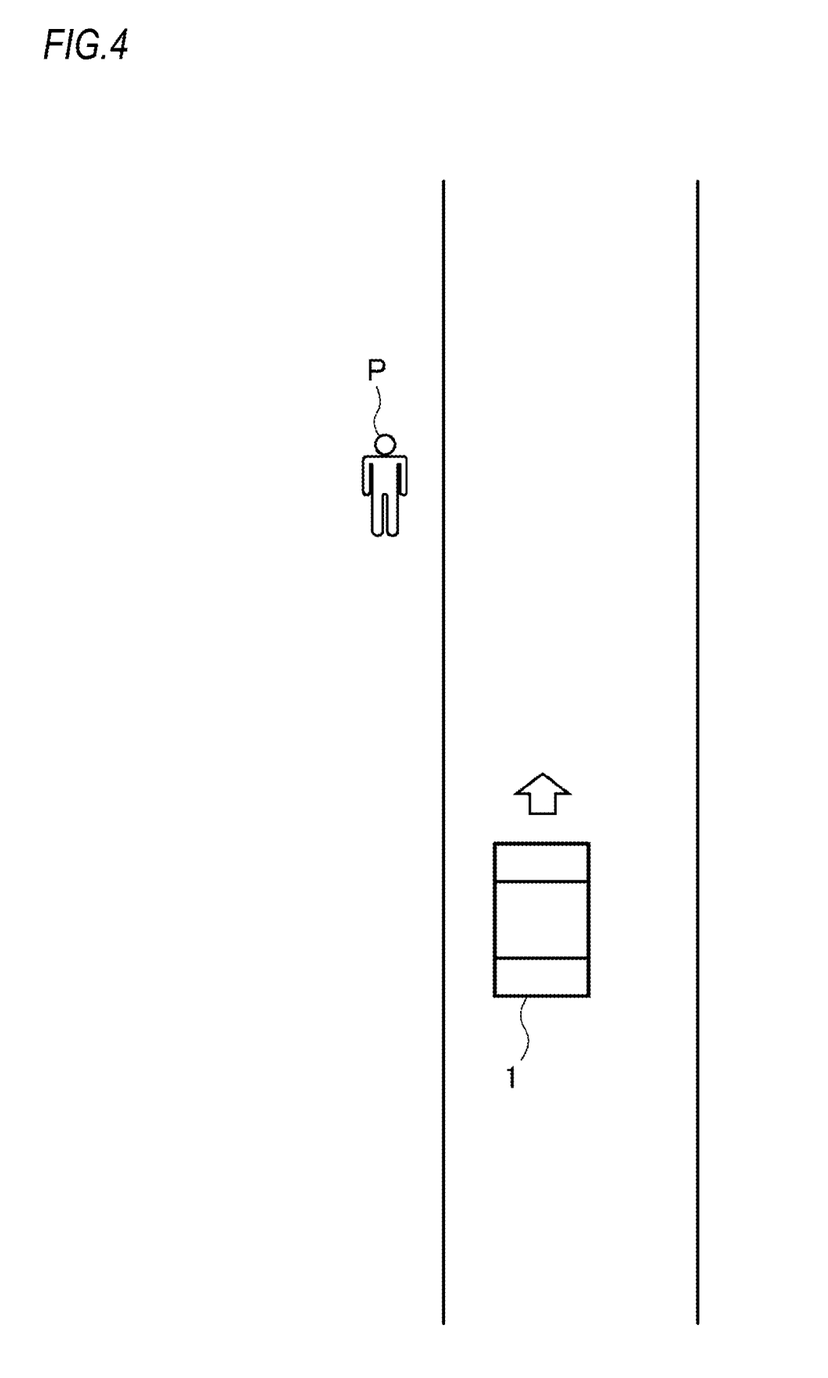
FIG. 4 is a view showing the vehicle and a pedestrian around the vehicle.
Figure 5:
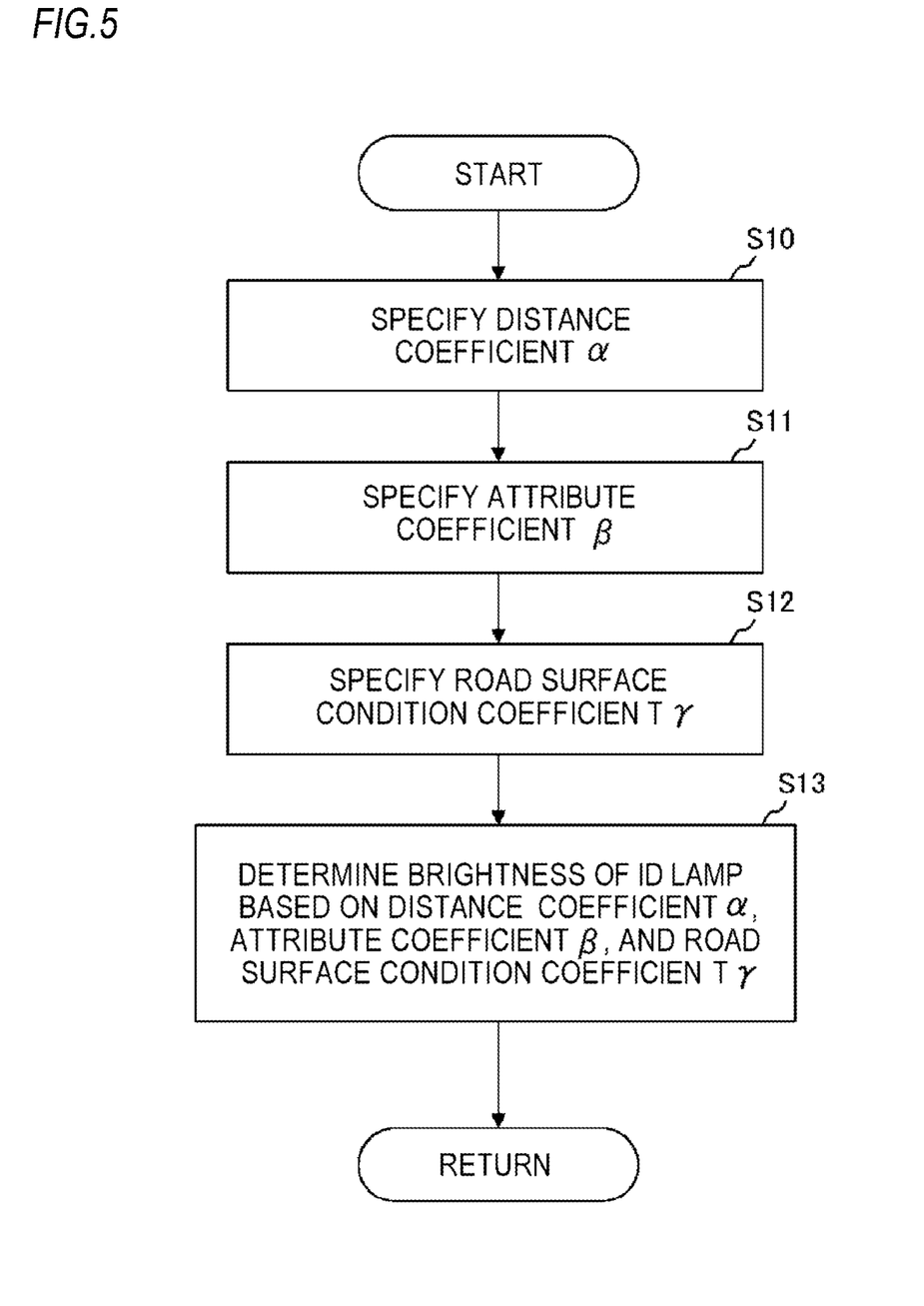
FIG. 5 is a flowchart illustrating details of the processing of step S6 shown in FIG. 3.

Next, processing of determining brightness of the ID lamp 42 will be described with reference to FIGS. 3 to 5. FIG. 3 is a flowchart illustrating an example of processing of determining the brightness of the ID lamp 42 in the vehicle lighting system 4 according to the present embodiment. FIG. 4 is a view showing the vehicle 1 and a pedestrian P around the vehicle 1. FIG. 5 is a flowchart illustrating details of the processing of step S6 shown in FIG. 3. In the following description, for convenience of explanation, it is assumed that only the pedestrian P is present around the vehicle 1 as the object.

As shown in FIG. 3, first, when the vehicle control unit 3 determines that the driving mode of the vehicle 1 is the advanced driving support mode or the fully automated driving mode (YES in step S1), the processing proceeds to step S2. On the other hand, when the vehicle control unit 3 determines that the driving mode of the vehicle 1 is neither the advanced driving support mode nor the fully automated driving mode (that is, the driving mode of the vehicle 1 is the driving support mode or the manual driving mode) (NO in step S1), the processing ends. Here, the driving mode of the vehicle 1 may be automatically switched by the vehicle control unit 3 or may be manually switched by an occupant.

Next, the vehicle control unit 3 specifies a road surface condition around the vehicle 1 (step S2). Particularly, the vehicle control unit 3 determines the road surface condition around the vehicle 1 based on the image data acquired from the camera 6 and/or the detection data (for example, the point group data) acquired from the radar 7 (for example, the LiDAR unit). For example, the vehicle control unit 3 specifies whether the road surface is wet and/or whether the road surface is paved as the road surface condition.

Next, in step S3, the vehicle control unit 3 determines whether the object such as a pedestrian and/or another vehicle is present around the vehicle 1. Specifically, the vehicle control unit 3 determines whether the object is present around the vehicle 1 based on the image data acquired from the camera 6 and/or the detection data acquired from the radar 7. When the determination result of step S3 is YES, the processing proceeds to step S4. When the determination result of step S3 is NO, the processing proceeds to step S7.

Next, in step S4, the vehicle control unit 3 specifies a distance between the vehicle 1 and the object (such as a pedestrian or another vehicle). For example, as shown in FIG. 4, since the pedestrian P is present around the vehicle 1, the vehicle control unit 3 specifies the distance between the vehicle 1 and the pedestrian P based on the image data acquired from the camera 6 and/or the detection data acquired from the radar 7. Here, the distance between the vehicle 1 and the pedestrian P may be the shortest distance therebetween.

Next, in step S4, the vehicle control unit 3 specifies an attribute of the object based on the image data acquired from the camera 6 and/or the detection data acquired from the radar 7. In the present embodiment, the vehicle control unit 3 specifies the attribute of the object to be a pedestrian. Thereafter, the vehicle control unit 3 transmits information on the road surface condition around the vehicle 1, information on the distance between the vehicle 1 and the object, and information on the attribute of the object to the lighting control unit 43.

Next, in step S6, the lighting control unit 43 determines brightness B of the ID lamp 42 based on the road surface condition around the vehicle 1, the distance between the vehicle 1 and the object (the pedestrian P), and the attribute of the object. Here, the "brightness of the headlamp 42" refers to the luminance, the luminous intensity, or the light amount of the ID lamp 42, or the illuminance of an area illuminated by the emitted light from the ID lamp 42. Details of the processing of step S6 will be described with reference to FIG. 5.

As shown in FIG. 5, in step S10, the lighting control unit 43 specifies a distance coefficient $\alpha$ based on a distance d between the vehicle 1 and the object (the pedestrian P). Particularly, the lighting control unit 43 may be configured to increase the distance coefficient $\alpha$ according to an increase in the distance d between the vehicle 1 and the object. For example, the lighting control unit 43 may gradually increase the distance coefficient $\alpha$ according to an increase in the distance d between the vehicle 1 and the object. In this regard, the distance coefficient $\alpha$ may be linearly changed according to the distance d. Alternatively, when the distance d between the vehicle 1 and the object is smaller than a predetermined threshold dth (d<dth), the lighting control unit 43 may set the distance coefficient $\alpha$ to $\alpha 1$; when the distance d is equal to or greater than the predetermined threshold dth (d≥dth), the lighting control unit 43 may set the distance coefficient $\alpha$ to $\alpha 2$ which is larger than $\alpha 1$. Further, a relational expression or a look-up table (LUT) indicating a relationship between the distance d and the distance coefficient $\alpha$ may be stored in a memory of the lighting control unit 43.

Next, in step S11, the lighting control unit 43 specifies an attribute coefficient $\beta$ based on the attribute of the object. For example, when the object is a pedestrian, the lighting control unit 43 may set the attribute coefficient $\beta$ to $\beta 1$; when the object is another vehicle, the lighting control unit 43 may set the attribute coefficient $\beta$ to $\beta 2$ which is larger than $\beta 1$. In this example, since the attribute of the object is a pedestrian, the attribute coefficient $\beta$ is set to $\beta 1$. Alternatively, a table indicating a relationship between the attribute of the object (a pedestrian, another vehicle) and the attribute coefficient $\beta$ may be stored in the memory of the lighting control unit 43.

Next, in step S12, the lighting control unit 43 specifies a road surface condition coefficient $\gamma$ based on the road surface condition around the vehicle 1. For example, when the road surface is not wet, the lighting control unit 43 may set the road surface condition coefficient $\gamma$ to $\gamma 1$; when the road surface is wet, the lighting control unit 43 may set the road surface condition coefficient $\gamma$ to $\gamma 2$ which is larger than $\gamma 1$. The lighting control unit 43 may specify the road surface condition coefficient $\gamma$ in consideration of a pavement condition of the road surface in addition to whether the road surface is wet. Alternatively, a table indicating a relationship between the road surface condition and the road surface condition coefficient $\gamma$ may be stored in the memory of the lighting control unit 43.

Next, in step S13, the lighting control unit 43 determines the brightness B of the ID lamp 42 based on the specified distance coefficient $\alpha$, the specified attribute coefficient $\beta$, and the specified road surface condition coefficient $\gamma$. For example, it is assumed that the reference brightness of the ID lamp 42 is B0. In this case, the lighting control unit 43 may determine the brightness of the ID lamp 42 based on the following relational expression (1).

$$B = \alpha \times \beta \times \gamma \times B0 \quad (1)$$

Alternatively, the lighting control unit 43 may determine the brightness B of the ID lamp 42 by referring to a look-up table (LUT) indicating the relationship between the brightness B of the ID lamp 42, the distance coefficient α, the attribute coefficient β, and the road surface condition coefficient γ. In this case also, as the distance coefficient α increases, the brightness B of the ID lamp 42 also increases. As the attribute coefficient β increases, the brightness B of the ID lamp 42 also increases. Further, as the road surface condition coefficient γ increases, the brightness B of the ID lamp 42 also increases.

For example, the brightness B1 of the ID lamp 42 obtained when the distance coefficient α=α1, the attribute coefficient β=β1, and the road surface condition coefficient γ=γ1 is smaller than the brightness B2 of the ID lamp 42 obtained when the distance coefficient α=α2 (>α1), the attribute coefficient β=β1, and the road surface condition coefficient γ=γ1. That is, the lighting control unit 43 is configured to increase the brightness B of the ID lamp 42 according to an increase in the distance d between the object and the vehicle 1 (that is, an increase in the distance coefficient α). As described above, since the brightness B of the ID lamp 42 increases according to an increase in the distance d between the object and the vehicle 1, the visibility of the ID lamp 42 from the object present at a position distant from the vehicle 1 can be sufficiently ensured.

The brightness B1 of the ID lamp 42 obtained when the distance coefficient α=α1, the attribute coefficient β=β1, and the road surface condition coefficient γ=γ1 is smaller than the brightness B3 of the ID lamp 42 obtained when the distance coefficient α=α1, the attribute coefficient β=β2 (>β1), and the road surface condition coefficient γ=γ1. That is, the brightness B3 of the ID lamp 42 when the object present around the vehicle 1 is another vehicle is larger than the brightness B1 of the ID lamp 42 when the object present around the vehicle 1 is a pedestrian. Accordingly, when the object is another vehicle, the lighting control unit 43 determines the brightness B of the ID lamp 42 to be the brightness B3 which is higher than the brightness B1. Accordingly, the visibility of the ID lamp 42 from the occupant of the other vehicle can be sufficiently ensured.

The brightness B1 of the ID lamp 42 obtained when the distance coefficient α=α1, the attribute coefficient β=β1, and the road surface condition coefficient γ=γ1 is smaller than the brightness B4 of the ID lamp 42 obtained when the distance coefficient α=α1, the attribute coefficient β=β1, and the road surface condition coefficient γ=γ2 (>γ1). That is, the brightness B4 of the ID lamp 42 when the road surface around the vehicle 1 is wet is larger than the brightness B1 of the ID lamp 42 when the road surface around the vehicle 1 is not wet. In this manner, when the road surface is wet, the lighting control unit 43 determines the brightness B of the ID lamp 42 to be the brightness B4 which is higher than the brightness B1. Accordingly, even when the road surface is wet, the visibility of the ID lamp 42 from the object can be sufficiently ensured.

Returning to FIG. 3, in step S7, the lighting control unit 43 determines the brightness B of the ID lamp 42 based on the road surface condition around the vehicle 1. First, the lighting control unit 43 specifies the road surface condition coefficient γ based on the road surface condition around the vehicle 1. As described above, when the road surface is not wet, the lighting control unit 43 may set the road surface condition coefficient γ to γ1; when the road surface is wet, the lighting control unit 43 may set the road surface condition coefficient γ to γ2 which is larger than γ1. Next, the lighting control unit 43 determines the brightness B of the ID lamp 42 based on the specified road surface condition coefficient γ. For example, it is assumed that the reference brightness of the ID lamp 42 is B0. In this case, the lighting control unit 43 may determine the brightness B of the ID lamp 42 based on a relational expression B=γ>B0. The lighting control unit 43 may determine the brightness B of the ID lamp 42 by referring to a look-up table (LUT) indicating the relationship between the brightness B of the ID lamp 42 and the road surface condition coefficient γ.

Next, in step S8, the lighting control unit 43 turns on the ID lamp 42 based on the determined brightness B of the ID lamp 42. In this manner, a series of processing shown in FIG. 3 is executed. According to the present embodiment, it is possible to provide the lighting system 4 which can sufficiently ensure the visibility of the ID lamp 42 from the object (the pedestrian P or the like) around the vehicle 1.

The present embodiment is also applicable to a case where a plurality of objects are present around the vehicle 1. For example, the distance coefficient α may be specified based on an average value or a median value of the distance between each object and the vehicle 1. When the number of pedestrians is larger than that of other vehicles among a plurality of objects around the vehicle 1, the attribute of the object may be specified as the pedestrian (that is, the attribute coefficient β may be set to β1). Further, the distance coefficient α and the attribute coefficient β may be specified based on the attribute of the object which is closest to or farthest from the vehicle 1 and a distance therebetween.

Further, in step S6, the lighting control unit 43 determines the brightness B of the ID lamp 42 based on the road surface condition around the vehicle 1, the distance d between the vehicle 1 and the object, and the attribute of the object, but the present embodiment is not limited thereto. In this regard, the lighting control unit 43 may determine the brightness B of the ID lamp 42 based on at least one of the road surface condition around the vehicle 1, the distance d between the vehicle 1 and the object, and the attribute of the object. For example, the lighting control unit 43 may determine the brightness B of the ID lamp 42 based on the distance d between the vehicle 1 and the object. In this case, the lighting control unit 43 may determine the brightness B of the ID lamp 42 based on a relational expression B=α×B0. The lighting control unit 43 may determine the brightness B of the ID lamp 42 based on the attribute of the vehicle 1. In this case, the lighting control unit 43 may determine the brightness B of the ID lamp 42 based on a relational expression B=β×B0. Further, the lighting control unit 43 may determine the brightness B of the ID lamp 42 based on the distance d between the vehicle and the object and the attribute of the vehicle 1. In this case, the lighting control unit 43 may determine the brightness B of the ID lamp 42 based on a relational expression B=α×β×B0. Further, the lighting control unit 43 may determine the brightness B of the ID lamp 42 based on the road surface condition around the vehicle 1, the distance d between the vehicle and the object, or the attribute of the vehicle 1.

The lighting control unit 43 may determine the brightness B of the ID lamp 42 based on the road surface condition around the vehicle 1 after the processing of step S2 is executed. That is, the processing of step S7 may be executed after the processing of step S2. In this case, the processing of steps S3 to S6 may be omitted.

The processing of determining the brightness of the ID lamp 42 has been described as an example of the ADS lamp in the present embodiment, but the present embodiment is not limited thereto. For example, the lighting control unit 43 may determine the brightness of the ID lamp 42 and/or the signal lamps 40L, 40R based on at least one of the road surface condition around the vehicle 1, the distance d between the vehicle 1 and the object, and the attribute of the object. In this case, it is possible to provide the lighting system 4 which can sufficiently ensure the visibility of the ID lamp 42 and/or the signal lamps 40L, 40R from the object outside the vehicle 1.

Although the embodiment of the present invention has been described, it is needless to say that the technical scope of the present invention should not be interpreted as being limited by the description of the present embodiment. The present embodiment is merely an example, and it is appreciated by those skilled in the art that various embodiments can be changed within the scope of the invention described in the claims. The technical scope of the present invention should be determined based on the scope of the invention described in the claims and the equivalent scope thereof.

In the present embodiment, the driving mode of the vehicle has been described as including the fully automated driving mode, the advanced driving support mode, the driving support mode, and the manual driving mode, but the driving mode of the vehicle should not be limited to these four modes. The classification of the driving mode of the vehicle may be appropriately changed according to laws or regulations relating to automated driving in each country. Similarly, the definitions of the "fully automated driving mode", the "advanced driving support mode", and the "driving support mode" described in the description of the present embodiment are merely examples, and the definitions may be appropriately changed according to laws or regulations relating to automated driving in each country.

The invention claimed is:

1. A vehicle lighting system provided in a vehicle capable of traveling in an automated driving mode, the vehicle lighting system comprising:
    an automated driving system (ADS) lamp configured to emit light toward an outside of the vehicle to visually present information relating to automated driving of the vehicle; and
    a lighting control unit configured to determine a brightness of the ADS lamp according to at least one of a distance between an object outside the vehicle and the vehicle, an attribute of the object, and a road surface condition around the vehicle,
    wherein the lighting control unit is configured to increase the brightness of the ADS lamp according to an increase in the distance between the object and the vehicle.

2. A vehicle lighting system provided in a vehicle capable of traveling in an automated driving mode, the vehicle lighting system comprising:
    an automated driving system (ADS) lamp configured to emit light toward an outside of the vehicle to visually present information relating to automated driving of the vehicle; and
    a lighting control unit configured to determine a brightness of the ADS lamp according to at least one of a distance between an object outside the vehicle and the vehicle, an attribute of the object, and a road surface condition around the vehicle,
    wherein the lighting control unit is configured to determine the brightness of the ADS lamp to be a first brightness when the object which is away from the vehicle by a predetermined distance is a pedestrian, and
    wherein the lighting control unit is configured to determine the brightness of the ADS lamp to be a second brightness which is higher than the first brightness when the object which is away from the vehicle by the predetermined distance is another vehicle.

3. A vehicle lighting system provided in a vehicle capable of traveling in an automated driving mode, the vehicle lighting system comprising:
    an automated driving system (ADS) lamp configured to emit light toward an outside of the vehicle to visually present information relating to automated driving of the vehicle; and
    a lighting control unit configured to determine a brightness of the ADS lamp according to at least one of a distance between an object outside the vehicle and the vehicle, an attribute of the object, and a road surface condition around the vehicle,
    wherein the lighting control unit is configured to determine the brightness of the ADS lamp to be a third brightness when the road surface is not wet, and
    wherein the lighting control unit is configured to determine the brightness of the ADS lamp to be a fourth brightness which is higher than the third brightness when the road surface is wet.

4. A vehicle capable of traveling in an automated driving mode, the vehicle comprising:
    the vehicle lighting system according to claim 1.

5. The vehicle lighting system according to claim 1,
    wherein the lighting control unit adjusts the ADS lamp to the determined brightness.

6. A vehicle capable of traveling in an automated driving mode, the vehicle comprising:
    the vehicle lighting system according to claim 2.

7. The vehicle lighting system according to claim 2,
    wherein the lighting control unit adjusts the ADS lamp to the determined brightness.

8. A vehicle capable of traveling in an automated driving mode, the vehicle comprising:
    the vehicle lighting system according to claim 3.

9. The vehicle lighting system according to claim 3,
    wherein the lighting control unit adjusts the ADS lamp to the determined brightness.

* * * * *